United States Patent [19]
Halem

[11] 3,918,543
[45] Nov. 11, 1975

[54] SYSTEM FOR EMPLOYING THE CHANGE OF MOMENTUM DURING VEHICLE DECELERATION FOR ACCESSORY POWER

[76] Inventor: Norman Halem, 3053 Skyline Drive, Cocoa, Fla. 32922

[22] Filed: Dec. 26, 1973

[21] Appl. No.: 428,073

[52] U.S. Cl.................. 180/77 R; 62/323; 192/.07
[51] Int. Cl.² ......................................... F02B 67/04
[58] Field of Search........... 180/77 R, 53 R; 62/133, 62/134, 323; 192/.07; 200/81.8; 322/35

[56] References Cited
UNITED STATES PATENTS

| | | | |
|---|---|---|---|
| 688,394 | 12/1901 | Creveling.......................... | 322/35 X |
| 1,745,130 | 1/1930 | Turner.............................. | 322/35 X |
| 1,768,165 | 6/1930 | Stokes.............................. | 322/35 X |
| 1,954,563 | 4/1934 | De Malaussene................. | 322/35 X |
| 3,459,006 | 8/1969 | Hoyer............................... | 62/323 X |
| 3,462,964 | 8/1969 | Haroldson...................... | 180/77 R X |
| 3,602,005 | 8/1971 | Kaye................................ | 62/323 X |
| 3,606,764 | 9/1971 | Yokouchi ........................ | 62/323 X |
| 3,678,700 | 7/1972 | Bomich............................. | 62/323 |
| 3,710,587 | 1/1973 | Hayashi .......................... | 62/323 X |

Primary Examiner—David Schonberg
Assistant Examiner—Terrance L. Siemens
Attorney, Agent, or Firm—Duckworth, Hobby & Allen

[57] ABSTRACT

Disclosed is a system of the type comprising an engine for performing a primary work function and at least one secondary work function, in which operation of the engine is characterized by alternating periods of primary work function load and no-load conditions, the system including means for loading the engine with the secondary work function only during the periods of primary work function no-load condition.

13 Claims, 5 Drawing Figures

FIG. 2

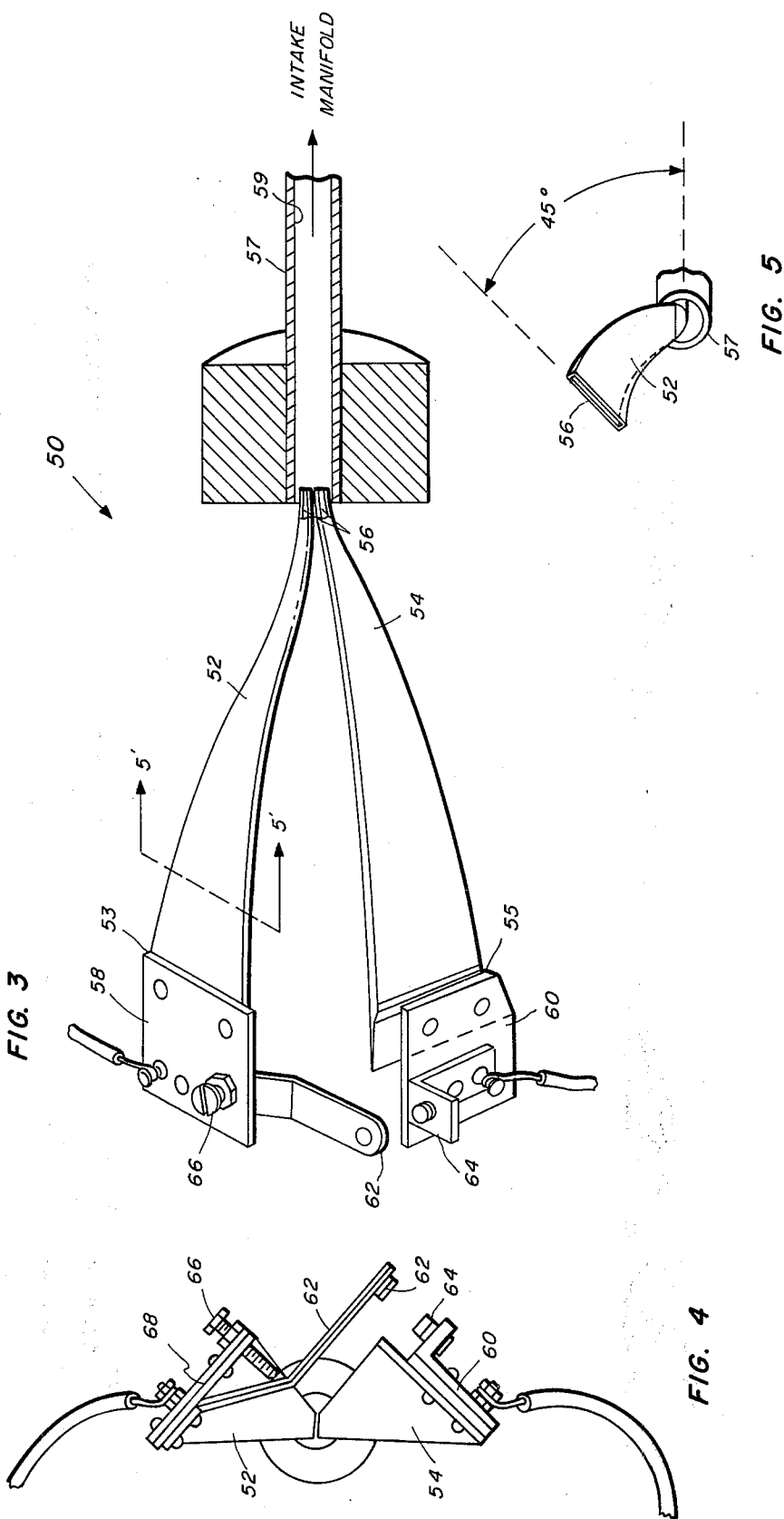

SYSTEM FOR EMPLOYING THE CHANGE OF MOMENTUM DURING VEHICLE DECELERATION FOR ACCESSORY POWER

BACKGROUND OF THE INVENTION

1. Field of the Invention

The present invention relates to engine-driven systems in which the engine is required to perform a plurality of work functions, and in particular, to such systems in which the work functions are selectively coupled to the engine in order to increase overall system efficiency.

2. Description of the Prior Art

Automobile engines presently are required to operate a variety of accessories as secondary work functions, as well as to perform the primary work function of motivating the vehicle. The secondary work functions include battery charging, air conditioner compressor drive and operation of pollution control equipment, to name but a few. As is well known, each additional secondary work function reduces the amount of power that can be devoted to the primary work function of driving the vehicle, an efficiency reduction which is ultimately manifested in larger fuel requirements per unit distance the vehicle travels.

There have been suggestions in the prior art for removing the load of some of the vehicle accessories only during periods when the vehicle requires additional power for rapid acceleration. Haroldson, in U.S. Pat. No. 3,462,964, discloses a system employing a manifold vacuum switch adapted to switch off the load represented by an automobile air conditioner compressor only during periods of rapid acceleration. Kaye, in U.S. Pat. No. 3,602,005, discloses a similar arrangement also employing means coupled to the spark advance. Another arrangement is disclosed in U.S. Pat. No. 3,186,184 to Pruitt. See also the following U.S. Pat. Nos. 2,107,341 to Peo; 2,268,667 to Mendez; 2,929,226 to Baker et al; and 3,121,314 to Koyanagi.

SUMMARY OF THE INVENTION

An important aspect of the present invention rests on the realization of the principle that vehicle engine powered accessories need not utilize the engine as their sole power source. Another form of energy, always present in a moving vehicle, can provide sufficient power to achieve acceptable accessory operation without burdening the fuel supply. This energy form, kinetic energy, while stored in the moving mass of the vehicle, can be extracted and translated to a work function by the resultant reaction caused by vehicle deceleration over a given period of time. Presently, the force generated in the time period when vehicle momentum changes with deceleration is not being exploited as the sole source of accessory power. Most of this force finds itself transformed to heat, generated by friction of wheels on pavement and vehicle brakes.

The present invention accordingly contemplates a system of the type comprising an engine for performing a primary work function and at least one secondary work function, in which operation of the engine is characterized by alternating periods of primary work function load and no-load conditions, the system further including means for loading the engine with the secondary work function only during the periods of primary work function no-load condition.

A system embodying the present invention will hereinafter be described with reference to FIG. 2. In order to more clearly define the principle upon which the present invention is based, there is illustrated in FIG. 1 a chart reflecting the three conditions under which an engine driven vehicle operates and the means in which energy sources are utilized in the present invention to power secondary work functions. As is well known, operation of any vehicle is characterized by alternating periods of acceleration and deceleration with occasional intervening periods of constant vehicle velocity, as is shown in the upper portion of FIG. 1. The durations of these respective periods, of course, vary from time to time depending upon a variety of factors including braking, road conditions, and so forth. In accordance with the present invention, the vehicle system includes means for energizing at least one of the accessories only during periods of vehicle deceleration, during which time power required to perform secondary work functions is supplied from the kinetic energy stored in the vehicle's moving mass and not the fuel consuming engine.

THE DRAWING

FIG. 3 is a side view of a manifold vacuum switch in accordance with the present invention.

FIG. 4 is an end view of the manifold vacuum switch of FIG. 3.

FIG. 5 is a cross section of a portion of the apparatus of FIG. 3, taken along the line of 5'—5'.

DETAILED DESCRIPTION

Figure 1:
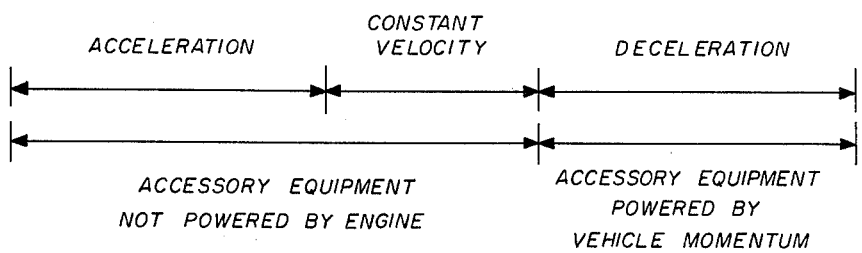
FIG. 1 is a diagram illustrating the principle established by the system of the present invention.
Figure 2:
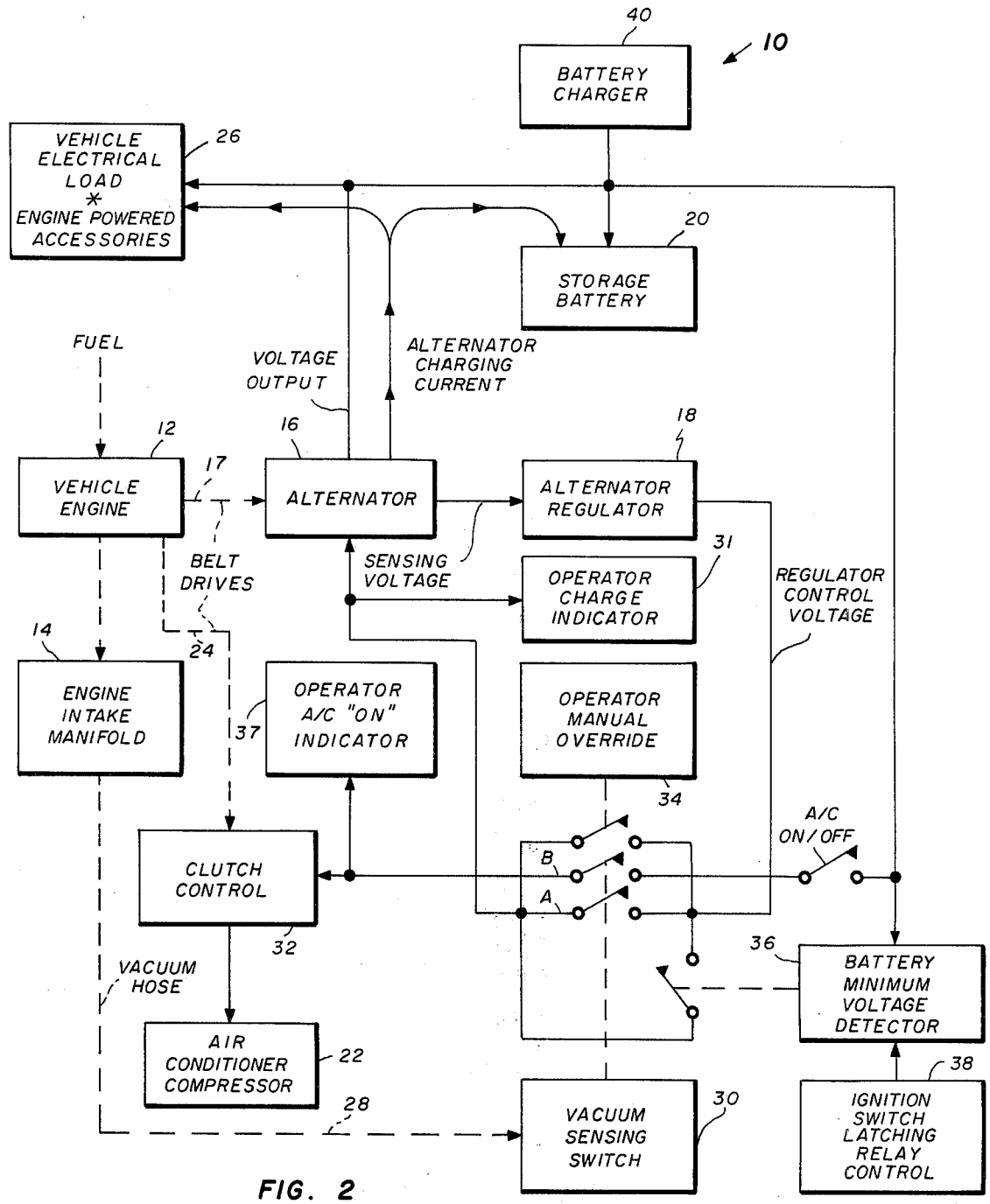
FIG. 2 is a block diagram illustrating the system in accordance with the present invention.

The system embodying this concept will now be described with reference to FIG. 2. The system described provides means for harnessing the vehicle's kinetic energy to provide power sufficient for performing secondary work functions in place of conventional fuel consuming power sources. Although the foregoing description relates to automobile systems, it is by no means intended to be limited in scope to such. The description, for ease in presentation, describes means for accomplishing the above stated objectives on a specific type of vehicle, but as will be evident to those skilled in the art, means can be employed in any vehicle or machine utilizing the same energy source for primary and secondary work functions.

The vehicle system, referred to generally as 10, includes an internal combustion engine 12 having an intake manifold 14 associated therewith. The system 10 further includes an alternator 16 coupled to the vehicle engine by a drive belt 17, with an alternator regulator 18 coupled to the alternator 16. The vehicle 10 further includes a storage battery 20 and additional electrical load and engine power and accessories, referred to generally as 26. The vehicle 10 may also include an air conditioner compressor 22 and clutch control 32 coupled to the vehicle engine by a drive belt 24. The apparatus described thus far and shown by block diagrams in FIG. 2 all constitute apparatus presently found on many internal combustion engine powered vehicles. One modification which might be made to this apparatus is to utilize a higher amperage rated storage battery 20 than is customarily employed.

In accordance with the present invention, the vehicle 10 is further provided with a vacuum hose 28 which is coupled to a vacuum sensing switch 30. The vacuum sensing switch 30, as shown, contains two switch elements, A and B. Multiple vacuum sensing switches containing single or multiple switch functions may also be employed to control the necessary number of secondary work functions. An operator manual override switch 34 is provided in parallel with switch A of the vacuum sensing switch 30 so as to provide a manual override capability during periods when engine conditions dictate switch A open, as described below. The system 10 further includes a minimum voltage detector 56 to which an ignition switch latching relay control 38 is coupled.

The system 10 in FIG. 2 operates in the following manner. During acceleration of the vehicle 10 or during periods of constant velocity, the vehicle 10 is motivated by the engine 12, the air conditioner load is off and the ignition system, lights and accessories represented at 26 are powered by the storage battery 20.

During periods of deceleration of the vehicle 10, the vehicle's engine loading requirements are reduced, resulting in an increased vacuum (decrease in pressure) in the intake manifold 14. At a predetermined point, the vacuum sensing switch 30 closes switch contact A which serially connects the alternator regulator 18 to the rotating field winding of the alternator 16. This in turn increases the output of the alternator 16 which then provides current to charge the storage battery 20 and power the remainder of the electrical system 26. An indicator lamp 31 within the vehicle's passenger compartment is illuminated and the sensing voltage between the alternator 16 and the regulator 18 function in a normal manner, i.e., causes a variation in the rotating field voltage in order to control the charging rate to the storage battery 20. Additionally, closure of contact B energizes the air conditioner compressor 22 to the engine 12 and lamp 37 within the vehicle operator compartment is illuminated. The exact manner in which the manifold sending switch 30 determines the point at which deceleration occurs will hereinafter be described in greater detail.

Upon termination of vehicle deceleration, the change of loading of the engine 12 is sensed by the vacuum sensing switch 30, and contacts A and B are opened. This removes the rotating field voltage of the alternator 16, which in turn removes the alternator output voltage and interrupts the charging current to the battery 20. Thereafter, the alternator 16 presents a negligible mechanical load to the vehicle engine 12 through the belt 17. The charge indicating lamp 31 switches off and the storage battery 20 will thereafter power the vehicle electrical load 26. The battery minimum voltage detector 36 monitors the voltage of the battery 20, whereupon a preset terminal voltage will energize the sensing switch and close its contact to again load the alternator 16 on the engine, in the event the battery voltage falls below a predetermined level. A manual over-ride switch 34, which may be located in the passenger compartment, may override any non-charging condition of the alternator 16 and effect normal charge of the battery 20 at the operator's discretion. Concurrently with the opening of contact A, contact B of the vacuum sensing switch 30 opens, deenergizing the clutch control 32, relieving engine 12 of the air conditioner 22 load and extinguishing the operator compartment air conditioner indicator 37. An external storage battery charging system 40 may be provided for over night or emergency battery charging.

A manifold vacuum switch in accordance with the present invention is shown in FIGS. 3, 4 and 5 and described with reference thereto. The manifold vacuum switch, referred to generally as 50, includes two flat, flexible members 52, 54 each having a respective sealed end 53, 55 and a hollow core 56. Each hollow core of the flat, flexible members 52, 54 communicates with the intake manifold via the hollow core 59 of a vacuum hose 57.

Noting FIG. 5, each flat, flexible member 52, 54 defines a twist of preferably about 45° in a direction axial with the hollow core 56. In use, pressure changes in the manifold cause flexing of each member 52, 54 in the axial direction, as shown by arrows in FIG. 3. Preferably, the members 52, 54 are twisted in opposite directions. The vacuum switch 50 further includes a pair of switch contacts 62, 64, each contact being carried by a respective plate 58, 60 mounted at the sealed end 53, 55 of the corresponding flexible member 52, 54. The contacts 62, 64 are juxtaposed with respect to each other, one of the carrying plates 58 including a threaded screw therethrough bearing against the corresponding contact 62 to provide means for adjusting the throw of that contact.

As shown in FIG. 4, at least one of the carrying plates, for example carrying plate 58, may comprise a bi-metallic element 68 which provides means serially coupled to the contact 62 for thermally latching the contact 62 to contact 64 when sufficient current has passed through the bi-metallic element 68 to create a bending moment therein.

The manifold vacuum switch 50 operates in the following manner. The space between the contacts 62, 64 is preset in a manner as hereinafter described. When the intake manifold pressure changes, each of the members 52, 54 flex in the axial direction, and because of the opposite twist moves towards each other thereby effecting closure of the contacts 62, 64.

In accordance with the present invention, the intake manifold pressure necessary to effect operation of the system as described above, varies as a function of several factors; vehicle size, type of engine, engine loading, condition of the engine, condition of the ignition system, geographic location, and the trade-off between accessory operation efficiency and fuel consumption. Each factor must be considered when implementing the system of the present invention, but can be determined empirically for each engine with the use of a test instrument to determine the optimum deceleration point or by operator-adjust, trial and error; i.e., adjust the device to provide illumination of the charge indicator lamp 31, located in the operator compartment, to coincide with vehicle deceleration as the operator releases the engine throttle. The optimum setting will be that which provides the best fuel mileage. It will, of course, be appreciated by those skilled in the art that, because of variations in the factors set forth above, the loading of any given accessory onto the engine precisely at the threshold of deceleration would be difficult over extended periods of time. It is therefore a primary purpose of this invention to approximate the threshold of deceleration as nearly as is practicable.

I claim:

1. In a system of the type comprising an internal combustion engine for performing a primary work function and at least one secondary work function, in which operation of said engine is characterized by alternating periods of primary work function load and no load conditions, said internal combustion engine being of the type including pressure differential means responsive to said load and no load conditions, means for loading said engine with said secondary work function only during said periods of primary work function no load condition, said loading means comprising:
   a flat flexible member having a sealed end and a hollow core communicating with said pressure differential means; and wherein
   changes in pressure within said pressure differential means causes flex of said member responsive thereto.

2. The system recited in claim 1 further comprising:
   an electrical power source;
   charging means coupled to said power source and to said engine as one of said secondary work functions; and wherein
   said charging means is operated by said engine only during said periods of primary work function no load condition.

3. The system recited in claim 2, said system defining a vehicle wherein said primary work function comprises motivating said vehicle.

4. A system as recited in claim 3 wherein said vehicle includes accessories carried thereby and operated by said engine as said secondary work functions.

5. A system as recited in claim 4 wherein operation of said vehicle is characterized by alternating periods of acceleration and deceleration with occasional intervening periods of constant vehicle velocity, said deceleration periods substantially defining said periods of primary work function no load condition.

6. In a vehicle of the type including an internal combustion engine for motivating said vehicle such that operation of said vehicle is characterized by alternating periods of acceleration and deceleration with occasional intervening periods of constant vehicle velocity, said engine of the type having an intake manifold the pressure within which changes responsive to said periods of acceleration and deceleration, the combination comprising:
   at least one accessory carried by said vehicle;
   means for coupling and decoupling said accessory to said engine so as to be intermittently driven thereby, said coupling and decoupling means comprising:
   a flat flexible member having a sealed end and a hollow core communicating with said manifold;
   means for flexing said member responsive to pressure changes in said manifold; and
   means for coupling said accessory to said engine during said periods of vehicle deceleration.

7. The combination recited in claim 6 wherein said coupling-decoupling means further comprises means for sensing the approximate deceleration point of said vehicle.

8. The combination recited in claim 6 wherein said flexing means comprises:
   said flat member defining a twist in a direction axial with said hollow core; and wherein
   pressure changes in said manifold causes flexing of said member in said axial direction.

9. The combination recited in claim 8 further comprising:
   a second flat, flexible member having an axial twist opposite to that of said one flat, flexible member; and
   a pair of juxtaposed switch contacts, each contact being carried by one of said flexible members at the respective sealed end thereof.

10. The combination recited in claim 9 further comprising means for adjusting the throw of one of said switch contacts whereby said contacts are adapted to close only upon sensing by said members of a predetermined manifold pressure.

11. The combination recited in claim 10 further comprising thermal-latching means serially coupled to one of said contacts.

12. The combination recited in claim 11, wherein said thermal latching means comprises a bi-metallic element.

13. The combination recited in claim 6, further comprising:
   a current source carried by said vehicle;
   said accessory comprising charging means coupled to said current source for charging said current source when coupled to said engine.

* * * * *